United States Patent [19]

Riffle et al.

[11] Patent Number: 5,183,861
[45] Date of Patent: Feb. 2, 1993

[54] POLYALKYLOXAZOLINE/POLYLACTONE COPOLYMERS, PROCESSES FOR MAKING, AND USES

[75] Inventors: Judy S. Riffle; Gurudus D. Sinai-Zingde; Andrew E. Brink, all of Blacksburg, Va.

[73] Assignee: Virginia Tech Intellectual Properties, Inc., Blacksburg, Va.

[21] Appl. No.: 355,709

[22] Filed: May 23, 1989

[51] Int. Cl.$^5$ ............................................. C08G 63/91
[52] U.S. Cl. ...................................... 525/413; 525/415
[58] Field of Search ................................ 525/413, 415

[56] References Cited

U.S. PATENT DOCUMENTS

| | | | |
|---|---|---|---|
| 3,375,231 | 3/1968 | Fukui et al. | 525/415 |
| 4,659,777 | 4/1987 | Riffle et al. | 525/100 |
| 4,910,268 | 3/1990 | Kobayashi | 525/411 |

OTHER PUBLICATIONS

J. Appl. Polymer Sci., vol. 31, 1189–1197 (1986).

*Primary Examiner*—Ana L. Carrillo
*Attorney, Agent, or Firm*—Richard P. Fennelly; Louis A. Morris

[57] ABSTRACT

Block copolymers of polyoxazoline and polylactone moieties can be used as polymeric compatibilizers for polyamides and polyolefins.

4 Claims, No Drawings

POLYALKYLOXAZOLINE/POLYLACTONE COPOLYMERS, PROCESSES FOR MAKING, AND USES

BACKGROUND OF THE INVENTION

1. Field of the Invention

The present invention relates to novel copolymers suitable for use as polymeric compatibilizers.

2. Description of the Prior Art

The blending of certain types of copolymer compositions (e.g., block copolymers) with other polymers either homopolymers or copolymers, is an industrially advantageous technique for the production of new polymeric materials with desirable properties. It is known that certain carefully defined block or graft copolymers possessing separate component blocks compatible with each of two homopolymers to be blended can act as emulsifiers for the blends.

Polylactones, particularly poly(epsilon)caprolactone are compatible with a number of high volume, commercial polymers, such as polypropylene, polyurethanes, and polyureas, polyvinylchloride, epoxy or phenoxy resins derived from bisphenol-A and epichlorohydrin, bisphenol-A based polycarbonates, acrylonitrile-butadiene-styrene (ABS) resins, styrene-acrylonitrile (SAN) resins, and styrene-maleic anhydride copolymers (O. Olabisi et al., "Polymer-Polymer Miscibility", Academic Press, New York, 1979 and D. R. Paul et al eds., "Polymer Blends", Vol. 2, Academic Press, New York, 1978).

Poly(2-ethyloxazoline) has been demonstrated to be miscible with certain polymers including styrene-acrylonitrile copolymers containing 25%, 40%, and 70% acrylonitrile, selected polyvinyl chloride/polyvinylidene chloride resins, phenoxy resins (see H. Keskkula et al., J. Appl. Polymer Sci , Vol 31, 1189–1197, 1986), styrene/acrylic acid copolymers, and styrene/maleimide copolymers (B. D. Dean, J. Appl. Polymer Sci. Vol. 34, 887–890, 1987)

SUMMARY OF THE INVENTION

The present invention relates to block copolymers of a polylactone and a polyalkyloxazoline, and the use of such copolymers as polymeric compatibilizers. The processes for forming such block copolymers also forms a part of the invention.

DETAILED DESCRIPTION OF THE INVENTION

As used herein, the terminology "block" copolymer is intended to connote copolymers of the structure $[-A-B-]_n$ where A is polylactone moiety and B is the polyoxazoline moiety with n being an integer over 1. Block copolymers are made up of alternating sections of the respective moieties.

In both of the copolymeric structures described above, the instant copolymers have a polylactone moiety as "A". This moiety is of the formula $$-[C(O)-R'-O]_n-$$

where R is alkylene. The moiety "B" is a polyoxazoline of the general formula

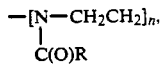

where R is aryl, alkyl or hydrogen. The subscript n can range from a minimum of about 5 to a maximum of about 1000.

For example, poly(2-ethyloxazoline)/polycaprolactone block copolymers possessing the general structure described above can be synthesized by first polymerizing ethyl oxazoline using benzyl iodide as the initiator, then terminating the reaction product with potassium hydroxide or ammonia. This produces a primary hydroxyl terminated or a primary amine terminated polyethyloxazoline oligomer of controllable molecular weight as illustrated in Examples 1 and 2. Subsequently, the terminal hydroxyl group or amine group initiates and polymerizes caprolactone in the presence of a Lewis acid catalyst as illustrated in Example 3.

The length of the polylactone units in the copolymers of the present invention can be varied widely and are preferably in the range of from about 5 to about 1500 (average value), whereas the length of the polyalkyloxazoline units is from about 5 to about 1500 (average value). The length of the respective units can be suitably controlled by the amounts of the respective reactants.

The copolymers described herein are deemed to be useful as compatibilizers for blends also containing polyamides (e.g., nylon 6) and polyolefins (e.g., polypropylene). These two classes of polymers are incompatible. The former have high strength and have a high melt temperature, but are moisture sensitive. The latter are inexpensive, hydropholic and possibly surface active. Compatibilized blends of these two disparate polymer classes would be of interest.

It has been found, for example, that it is possible to form a masterbatch of 90% polypropylene and 10% of a 30,000 unit/30,000 unit diblock copolymer of this invention at about 180° C. and then blend that masterbatch material with nylon-6 to achieve a final blend containing 90% nylon-6, 10% polypropylene and 1% compatibilizer copolymer and achieve the stress strain relationship B shown in the Figure which forms a part of this Specification. In the Figure, A represents a control experiment of a 90/10 nylon-6/polypropylene blend without compatibilizer.

The instant invention is further illustrated by the Examples which follow.

EXAMPLE 1

This Example illustrates the preparation of poly(2-ethyloxazoline) oligomer of about 5000 molecular weight containing hydroxyl end groups.

The 2-ethyloxazoline monomer was dried and fractionally distilled from calcium hydride prior to use. Chlorobenzene was stirred over sulfuric acid for two weeks, separated and washed with sodium bicarbonate, then with water several times, was dried over calcium hydride and was fractionally distilled before using. Benzyl iodide was prepared from sodium iodide and benzyl chloride in acetone at 50° C., and was recrystallized twice from hexane prior to use. A stock solution of 10% benzyl iodide in chlorobenzene was first prepared. The 2-ethyloxazoline monomer was polymerized by charging a round-bottom flask with 5.1 ml of 2-ethyloxazoline, 15 ml chlorobenzene, and 2.18 ml (0.001 mole) of the stock solution of benzyl iodide in chlorobenzene and maintaining a temperature of 115°–120° C. until the disappearance of monomer by proton nmr. In order to terminate the reaction with hydroxyl groups, the polymerization mixture was cooled to room temperature and a slight excess of 0.1N methanolic potassium hydroxide was added all at once. The yellow-brown color of the oxazolinium ion immediately disappeared. In order to recover the polymer, the solution was washed several times with water, then with sodium thiosulfate, then with water again and the chlorobenzene was removed. The polymer was diluted with tetrahydrofuran and was coagulated in hexane. After filtration, the hydroxyl terminated poly(2-ethyloxazoline) was dried at 40° C. under vacuum to a constant weight.

EXAMPLE 2

This Example illustrates the preparation of poly(2-ethyloxazoline) oligomer of about 5000 molecular weight containing primary amine end groups.

The polymer was prepared up to the termination point in the same manner as in Example 1. To terminate the material with a primary amine, in a separate flask, dry ammonia gas (purity 99.99%) was bubbled through 15 ml of dry methanol kept at 0° C. with an ice bath for thirty minutes. The ice bath was removed, and the solution was allowed to come to room temperature. Subsequently, the polymer solution was added via syringe to the ammonia solution. The yellow-brown color characteristic of the oxazolinium ion immediately disappeared. The mixture was stirred at room temperature for twelve hours. The polymer was isolated as in Example 1.

EXAMPLE 3

This Example illustrates the preparation of a polyethyloxazoline/polycaprolactone diblock copolymer of about 10,000 molecular weight for each block segment.

Eight grams of a hydroxyl terminated poly(2-ethyloxazoline) oligomer and 30 ml dry chlorobenzene were charged to a previously flame-dried apparatus. A fraction of the chlorobenzene and any residual water which may have been present in the solvent or in the polyethyloxazoline was distilled off. Eight milliliters of a previously dried epsilon-caprolactone monomer was added, and the mixture was heated to 150° C. Stannous octoate (500 ppm) was added to catalyze the reaction, and the temperature was maintained until the disappearance of monomer as judged by proton nmr.

The foregoing Examples have been presented to illustrate certain embodiments of the invention and should not therefore be construed in a limiting sense. The scope of protection which is sought is set forth in the claims which follow.

We claim:

1. A block copolymer comprising as respective polymer units poly(2-oxazoline) and polylactone moieties.

2. A block copolymer as claimed in claim 1 wherein the average length of the respective polymer units ranges from about 5 to about 1500.

3. A block copolymer as claimed in claim 1 wherein is formed by polymerizing a 2-alkyloxazoline, terminating the reaction product with a group which can polymerize with caprolactone, and then polymerizing the product with caprolactone.

4. A block copolymer as claimed in claim 5 wherein the polymerization with the caprolactone is in the presence of a Lewis acid catalyst.

* * * * *